United States Patent
Yoshizawa et al.

(10) Patent No.: US 12,306,302 B2
(45) Date of Patent: May 20, 2025

(54) IMAGE PROCESSING DEVICE, CONTROL PROGRAM, AND IMAGE PROCESSING METHOD

(71) Applicant: Konica Minolta, Inc., Tokyo (JP)

(72) Inventors: Masanori Yoshizawa, Hino (JP); Hideki Morita, Kodaira (JP)

(73) Assignee: Konica Minolta, Inc., Tokyo (JP)

(*) Notice: Subject to any disclaimer, the term of this patent is extended or adjusted under 35 U.S.C. 154(b) by 1060 days.

(21) Appl. No.: 17/285,533

(22) PCT Filed: Sep. 11, 2019

(86) PCT No.: PCT/JP2019/035760
§ 371 (c)(1),
(2) Date: Apr. 15, 2021

(87) PCT Pub. No.: WO2020/084943
PCT Pub. Date: Apr. 30, 2020

(65) Prior Publication Data
US 2021/0389460 A1    Dec. 16, 2021

(30) Foreign Application Priority Data
Oct. 24, 2018  (JP) .................. 2018-200132

(51) Int. Cl.
*G01S 17/42* (2006.01)
*G01S 7/48* (2006.01)
(Continued)

(52) U.S. Cl.
CPC ............ *G01S 17/42* (2013.01); *G01S 7/4802* (2013.01); *G01S 17/04* (2020.01); *G01S 17/89* (2013.01)

(58) Field of Classification Search
CPC .......... G01S 17/42; G01S 17/89; G01S 17/04; G01S 7/4802; G01S 7/4817; G01S 17/10;
(Continued)

(56) References Cited

U.S. PATENT DOCUMENTS
2012/0173184 A1    7/2012 Ovsiannikov et al.

FOREIGN PATENT DOCUMENTS
JP    2005-300259 A    10/2005
JP    2007-126025 A    5/2007

OTHER PUBLICATIONS
Extended European Search Report dated Mar. 23, 2022 issued for the corresponding European application No. 1 19875403.8.
(Continued)

*Primary Examiner* — Daniel L Murphy
(74) *Attorney, Agent, or Firm* — RANKIN, HILL & CLARK LLP

(57) ABSTRACT

A distance up to an object which is even an object, such as a black vehicle, whose reflected waves cannot be obtained is detected. An image processing device 200 performs determination processing, as to pixels of distance measuring point group data obtained in measurement made by a ToF system, which determines a condition (i): distance values of the pixels are identifiers which indicate that the distance values are not obtained; a condition (ii): distance values of reference background data corresponding to pixels being targeted for the determination processing are not the identifiers; and a condition (iii): distance values of neighboring pixels which neighbor determination target pixels are smaller than the distance values of the reference background data corresponding to the neighboring pixels, and when all of the conditions (i) to (iii) are satisfied, predetermined distance values are substituted for the distance values of the pixels being targeted for the determination.

20 Claims, 9 Drawing Sheets

(51) Int. Cl.
*G01S 17/04* (2020.01)
*G01S 17/89* (2020.01)
(58) Field of Classification Search
CPC ...... G01S 17/50; G01S 17/894; G01S 17/931;
G08G 1/0116; G08G 1/0133; G08G
1/0141; G08G 1/015; G08G 1/04; G08G
1/164
USPC ........................................................ 356/4.01
See application file for complete search history.

(56) References Cited

OTHER PUBLICATIONS

International Search Report (ISR) dated Dec. 3, 2019 filed in PCT/JP2019/035760.

FIG. 5

| | DETERMINATION RESULT (HISTORY INFORMATION) | CONDITION |
|---|---|---|
| ① | BACKGROUND PIXEL | (REFERENCE BACKGROUND PIXEL DISTANCE VALUE − DETERMINATION PIXEL DISTANCE VALUE (FINITE DISTANCE)) ≤ THRESHOLD VALUE |
| ② | FOREGROUND PIXEL | (REFERENCE BACKGROUND PIXEL DISTANCE VALUE − DETERMINATION PIXEL DISTANCE VALUE (FINITE PIXEL)) > THRESHOLD VALUE |
| ③ | INFINITY BACKGROUND PIXEL | REFERENCE BACKGROUND PIXEL DISTANCE VALUE INDICATES INFINITY, AND DETERMINATION PIXEL DISTANCE VALUE INDICATES INFINITY |
| ④ | PIXEL WITH SUBSTITUTION | DETERMINATION PIXEL DISTANCE VALUE INDICATES INFINITY, REFERENCE BACKGROUND PIXEL DISTANCE VALUE DOES NOT INDICATE INFINITY, AND ANY OF DISTANCE VALUES OF NEIGHBORING PIXELS IS SMALLER THAN REFERENCE BACKGROUND |
| ⑤ | PIXEL WITHOUT SUBSTITUTION | DETERMINATION PIXEL DISTANCE VALUE INDICATES INFINITY, REFERENCE BACKGROUND PIXEL DISTANCE VALUE DOES NOT INDICATE INFINITY, AND ANY OF DISTANCE VALUES OF NEIGHBORING PIXELS IS NOT SMALLER THAN REFERENCE BACKGROUND |

FIG. 6

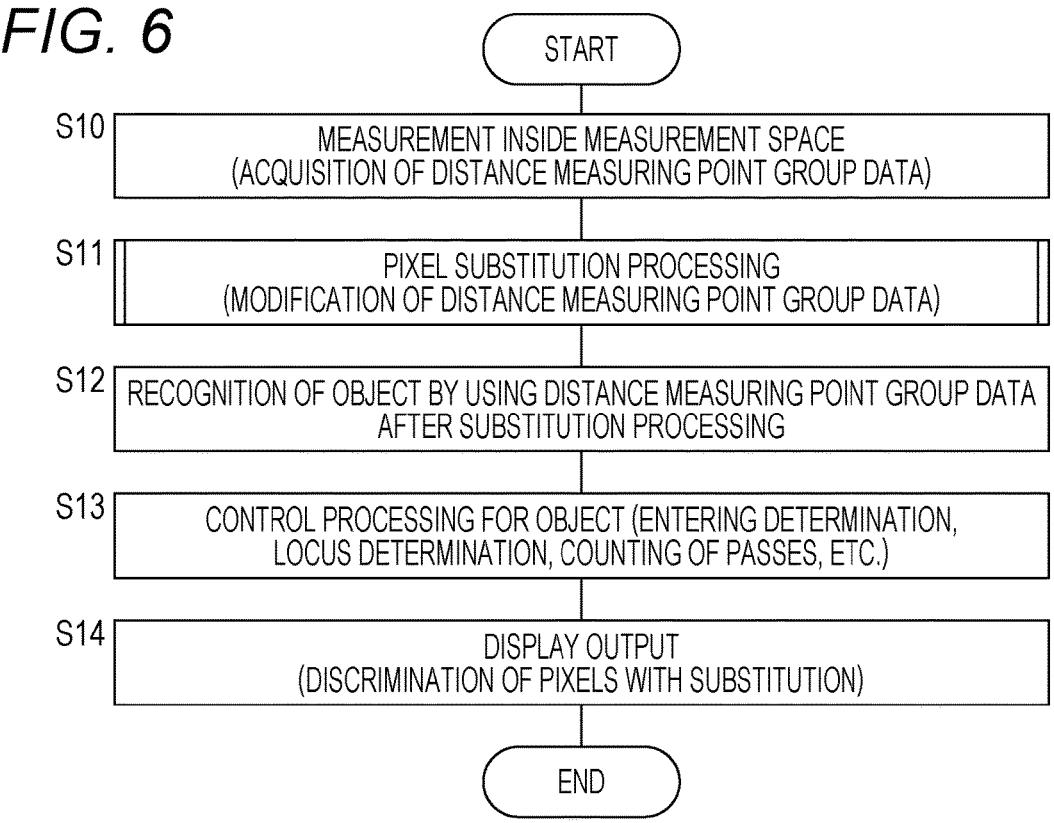

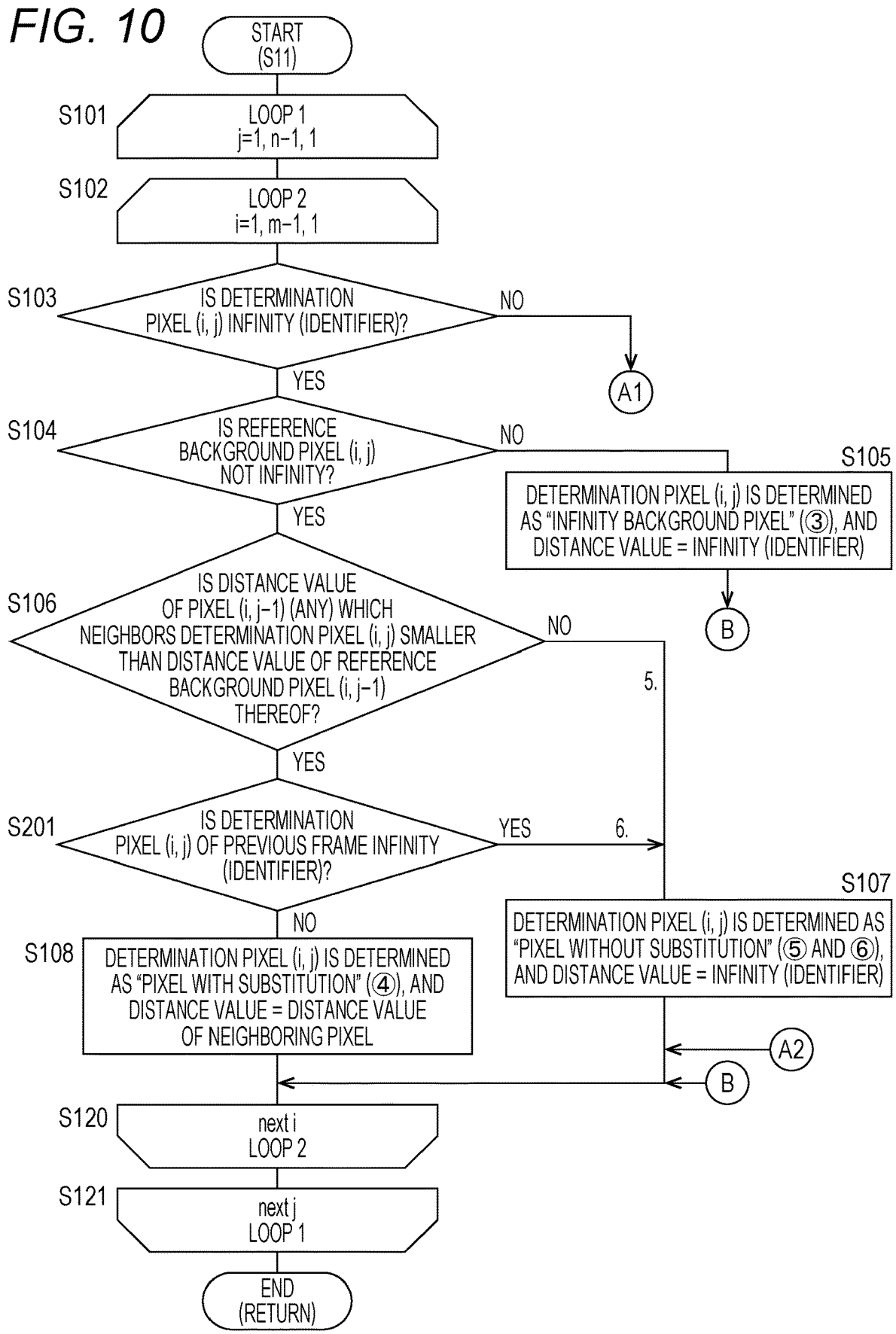

*FIG. 11*

| | DETERMINATION RESULT (HISTORY INFORMATION) | CONDITION |
|---|---|---|
| ① | BACKGROUND PIXEL | (REFERENCE BACKGROUND PIXEL DISTANCE VALUE − DETERMINATION PIXEL DISTANCE VALUE (FINITE DISTANCE)) ≤ THRESHOLD VALUE |
| ② | FOREGROUND PIXEL | (REFERENCE BACKGROUND PIXEL DISTANCE VALUE − DETERMINATION PIXEL DISTANCE VALUE (FINITE PIXEL)) > THRESHOLD VALUE |
| ③ | INFINITY BACKGROUND PIXEL | REFERENCE BACKGROUND PIXEL DISTANCE VALUE INDICATES INFINITY, AND DETERMINATION PIXEL DISTANCE VALUE INDICATES INFINITY |
| ④ | PIXEL WITH SUBSTITUTION | DETERMINATION PIXEL DISTANCE VALUE INDICATES INFINITY, REFERENCE BACKGROUND PIXEL DISTANCE VALUE DOES NOT INDICATE INFINITY, ANY OF DISTANCE VALUES OF NEIGHBORING PIXELS IS SMALLER THAN REFERENCE BACKGROUND, AND DISTANCE VALUES OF PREVIOUS FRAME DO NOT INDICATE INFINITY |
| ⑤ | PIXEL WITHOUT SUBSTITUTION | DETERMINATION PIXEL DISTANCE VALUE INDICATES INFINITY, REFERENCE BACKGROUND PIXEL DISTANCE VALUE DOES NOT INDICATE INFINITY, AND ANY OF DISTANCE VALUES OF NEIGHBORING PIXELS IS NOT SMALLER THAN REFERENCE BACKGROUND |
| ⑥ | PIXEL WITHOUT SUBSTITUTION | DETERMINATION PIXEL DISTANCE VALUE INDICATES INFINITY, REFERENCE BACKGROUND PIXEL DISTANCE VALUE DOES NOT INDICATE INFINITY, AND VALUES OF PREVIOUS FRAME INDICATE INFINITY |

IMAGE PROCESSING DEVICE, CONTROL PROGRAM, AND IMAGE PROCESSING METHOD

TECHNICAL FIELD

The present invention relates to an image processing device, a control program, and an image processing method.

BACKGROUND ART

In recent years, for the purpose of detecting an intruder or a vehicle within a measurement space, object detection systems, each of which detects an object from distance measuring point group data (a distance image) which is detected by a measuring instrument using a time of flight (ToF) system such as a laser radar, have been used. Here, the distance measuring point group data is obtained by mapping distance values up to the object on two-dimensional coordinates. As a method for extracting, from the distance measuring point group data, pixels which include a moving object, also as described in Patent Literature 1, a method in which the distance measuring point group data as a measurement result and a previously acquired background image (that is, distance measuring point group data in a state in which the moving object is not present) are compared and pixels having differences in distances are extracted has been known.

Incidentally, the laser radar acquires distance values up to a target object by measuring time periods from when laser light with which the target object is irradiated is reflected to when the laser light returns to a light receiving part. Therefore, in a case where total reflection occurs because a surface of the target object is a mirror surface or a case where there are many absorption components because the surface of the object is black or because of other, the laser light does not sufficiently return to the light receiving part and the distance values up to the target object cannot be acquired. For example, in a case where a puddle made on a road surface by rainfall is present or a case where the target object is a glossy black vehicle, sufficient reflected light amounts cannot be obtained and the distance values cannot be acquired.

In Patent Literature 2, disclosed is an object detection unit which extracts an irradiation angle at which a reflected light amount of the laser light with which the target object is irradiated cannot be obtained and determines that at the irradiation angle, a moving object such as a black vehicle is present. In addition, further in Patent Literature 2, also disclosed is a configuration in which in four corners of a crossing path across a railroad crossing, a plurality of object detection units are arranged in such a way that detection regions of the object detection units mutually overlap, and in this configuration, detection results obtained from the object detection units are collated with one another, thereby estimating a shape of the moving object.

CITATION LIST

Patent Literature

Patent Literature 1: JP 2005-300259 A
Patent Literature 2: JP 2007-126025 A

SUMMARY OF INVENTION

Technical Problem

However, in Patent Literature 2, although a direction (the irradiation angle) in which the black vehicle or the like is present can be obtained, distance values up to the object and a shape thereof cannot be obtained. In order to obtain the distance values and the shape, it is required to collate the detection results from the plurality of object detection units arranged in the four corners of the crossing path, and application thereof is thereby limited to a particular place and the apparatus becomes large-scale.

In view of the above-described circumstances, the present invention has been devised, and an object thereof is to provide an image processing device which is operable to accurately detect distance values up to an object even when the object is an object, from which reflected waves cannot be obtained, such as a black vehicle.

Solution to Problem

The above-mentioned object of the present invention is achieved by the following means.

(1) An image processing device includes:

an acquisition part which acquires distance measuring point group data showing distribution of distance values being calculated based on time intervals from when transmission waves directed in a plurality of orientations are applied from a measuring instrument toward a measurement space to when reflected waves of the transmission waves from a target object are received, the distance measuring point group data being constituted of a plurality of pixels;

a storage part which stores reference background data being generated based on the distance measuring point group data; and a pixel determination part, the pixels of the distance measuring point group data have embedded therein common identifiers being identifiable in a case where the distance values are unable to be acquired based on the reflected waves from directions in which the transmission waves are sent, as to the pixels of the distance measuring point group data being acquired from the acquisition part, the pixel determination part performs determination processing which determines:

a condition (i): distance values of the pixels are the identifiers which indicate that the distance values are not obtained;

a condition (ii): distance values of the reference background data corresponding to pixels being targeted for the determination processing are not the identifiers; and a condition (iii): distance values of neighboring pixels which neighbor determination target pixels are smaller than the distance values of the reference background data corresponding to the neighboring pixels, and when all of the conditions (i) to (iii) are satisfied, predetermined distance values are substituted for the distance values of the pixels being targeted for the determination.

(2) The image processing device according to the above-described (1) further includes an object determination part which performs object detection by using the reference background data and distance measuring point group data which has been subjected to processing of the substitution by the pixel determination part.

(3) In the image processing device according to the above-described (1) or (2), as the distance values of the neighboring pixels which are used for the determination of the condition (iii), distance values which have been subjected to the substitution processing by the determination processing for the neighboring pixels are used.

(4) In the image processing device according to any one of the above-described (1) to (3), the acquisition part acquires a plurality of pieces of the distance measuring point group data being arranged in time series, the pixel determination part further determines a condition (iv): in the distance measuring point group data which is temporally previous, pixels corresponding to the pixels being targeted for the determination are not the identifiers, and when all of the conditions (i) to (iv) are satisfied, the predetermined distance values are substituted for the distance values of the pixels being targeted for the determination.

(5) In the image processing device according to the above-described (4), the pixel determination part uses, as the distance measuring point group data which is temporally previous in the condition (iv), distance measuring point group data within a predetermined period of time from the distance measuring point group data which is subjected to the determination.

(6) In the image processing device according to any one of the above-described (1) to (5), the pixel determination part uses, as the predetermined distance values being used for the substitution, distance values of pixels which neighbor the pixels being targeted for the determination or distance values of surrounding pixels which are present within a predetermined range from the pixels being targeted for the determination.

(7) In the image processing device according to any one of the above-described (1) to (6), the storage part has stored therein history information of the processing of the pixels of the distance measuring point group data, and in the history information, at least information showing the pixels with substitution for which the processing of the substitution has been performed is included.

(8) The image processing device according to the above-described (7) further includes an output part which displays the distance measuring point group data after the substitution, which has been subjected to the processing of the substitution by the pixel determination part, and in the display made by the output part, by referencing the history information, the pixels with substitution are displayed in a manner in which the pixels with substitution are identifiable from other pixels.

(9) In the image processing device according to the above-described (2), the object determination part performs at least one of: determination of entering of an object or objects to a predetermined area which is set within the measurement space; counting of the object or objects passing through the predetermined area; and determination of a movement locus or movement loci of the object or objects.

(10) In the image processing device according to any one of the above-described (1) to (9), the measuring instrument is a lidar which applies laser light as the transmission waves.

(11) A control program being executed by a computer which controls an image processing device performing image processing using distance measuring point group data showing distribution of distance values up to a target object, the image processing device including a storage part which has stored therein reference background data being generated based on the distance measuring point group data, includes:

a step (a) of acquiring distance measuring point group data showing distribution of distance values being calculated based on time intervals from when transmission waves directed in a plurality of orientations are applied from a measuring instrument toward a measurement space to when reflected waves of the transmission waves from a target object are received, the distance measuring point group data being constituted of a plurality of pixels, the pixels of the distance measuring point group data being acquired in the step (a) having embedded therein common identifiers being identifiable in a case where the distance values are unable to be acquired based on the reflected waves from directions in which the transmission waves are sent;

a step (b) of, as to the pixels of the distance measuring point group data, performing determination processing which determines:

a condition (i): distance values of the pixels are the identifiers which indicate that the distance values are not obtained;

a condition (ii): distance values of the reference background data corresponding to pixels being targeted for the determination processing are not the identifiers; and a condition (iii): distance values of neighboring pixels which neighbor determination target pixels are smaller than the distance values of the reference background data corresponding to the neighboring pixels; and a step (c) of, when all of the conditions (i) to (iii) are satisfied in the step (b), substituting predetermined distance values for the distance values of the pixels being targeted for the determination, the control program causing the computer to perform the processing including the steps (a), (b), and (c).

(12) The control program according to the above-described (11) further includes a step (d) of performing object detection by using the reference background data and the distance measuring point group data which has been subjected to processing of substitution in the step (c).

(13) In the control program according to the above-described (11) or (12), as the distance values of the neighboring pixels which are used for the determination of the condition (iii) in the step (b), distance values which have been subjected to the substitution processing by the determination processing for the neighboring pixels are used.

(14) In the control program according to any one of the above-described (11) to (13), in the step (a), a plurality of pieces of the distance measuring point group data being arranged in time series are acquired, in the step (b), further determined is a condition (iv): in the distance measuring point group data which is temporally previous, pixels corresponding to the pixels being targeted for the determination are not the identifiers, and in the step (c), when all of the conditions (i) to (iv) are satisfied, the predetermined distance values are substituted for the distance values of the pixels being targeted for the determination.

(15) In the control program according to the above-described (14), used as the distance measuring point group data which is temporally previous in the condition (iv) in the step (b) is distance measuring point group data within a predetermined period of time from the distance measuring point group data which is subjected to the determination.

(16) In the control program according to any one of the above-described (11) to (15), used as the predetermined distance values being used for the substitution in the step (c) are distance values of pixels which neighbor the pixels being targeted for the determination or distance values of surrounding pixels which are present within a predetermined range from the pixels being targeted for the determination.

(17) The control program according to any one of the above-described (11) to (16), the processing further includes a step (e) of storing, in the storage part, history information including at least information showing the pixels with substitution for which the processing of the substitution has been performed in the step (c).

(18) In the control program according to the above-described (17), the processing further includes a step (f) of displaying the distance measuring point group data after the substitution, which has been subjected to the processing of the substitution in the step (c), and in the display made in the step (f), by referencing the history information, the pixels with substitution are displayed in a manner in which the pixels with substitution are identifiable from other pixels.

(19) In the control program according to the above-described (12), the processing further includes a step (g) of performing to the object detected at the step (d), at least one of: determination of entering of an object or objects to a predetermined area which is set within the measurement space; counting of the object or objects passing through the predetermined area; and determination of a movement locus or movement loci of the object or objects.

(20) An image processing method being executed by an image processing device performing image processing using distance measuring point group data showing distribution of distance values up to a target object, the image processing device including a storage part which has stored therein reference background data being generated based on the distance measuring point group data, includes:

a step (a) of acquiring distance measuring point group data showing distribution of distance values being calculated based on time intervals from when transmission waves directed in a plurality of orientations are applied from a measuring instrument toward a measurement space to when reflected waves of the transmission waves from a target object are received, the distance measuring point group data being constituted of a plurality of pixels, the pixels of the distance measuring point group data being acquired in the step (a) having embedded therein common identifiers being identifiable in a case where the distance values are unable to be acquired based on the reflected waves from directions in which the transmission waves are sent;

a step (b) of, as to the pixels of the distance measuring point group data, performing determination processing which determines:

a condition (i): distance values of the pixels are the identifiers which indicate that the distance values are not obtained;

a condition (ii): distance values of the reference background data corresponding to pixels being targeted for the determination processing are not the identifiers; and a condition (iii): distance values of neighboring pixels which neighbor determination target pixels are smaller than the distance values of the reference background data corresponding to the neighboring pixels; and a step (c) of, when all of the conditions (i) to (iii) are satisfied in the step (b), substituting predetermined distance values for the distance values of the pixels being targeted for the determination.

Advantageous Effects of Invention

According to the present invention, as to pixels of distance measuring point group data showing distribution of distance values calculated based on time intervals from when transmission waves directed in a plurality of orientations are applied toward a measurement space to when reflected waves of the transmission waves from a target object are received, the distance measuring point group data being constituted of a plurality of pixels, performed is determination processing which determines: a condition (i): distance values of the pixels are the identifiers which indicate that the distance values are not obtained; a condition (ii): distance values of the reference background data corresponding to pixels being targeted for the determination processing are not the identifiers; and a condition (iii): distance values of neighboring pixels which neighbor determination target pixels are smaller than the distance values of the reference background data corresponding to the neighboring pixels, and when all of the conditions (i) to (iii) are satisfied, predetermined distance values are substituted for the distance values of the pixels being targeted for the determination By performing the processing as described above, the predetermined distance values are substituted for the pixels whose distance values cannot be obtained, thereby allowing the pixels showing distance values of the identifiers to be identified as a part of an object. Thus, accuracy of object detection can be enhanced.

BRIEF DESCRIPTION OF DRAWINGS

FIG. 5 is a table showing determination conditions of pixels and determination results.

FIG. 6 is a flowchart illustrating image processing in a first embodiment.

FIG. 10 is a subroutine flowchart illustrating image processing in a second embodiment.

FIG. 11 is a table showing determination conditions of pixels and determination results in the second embodiment.

DESCRIPTION OF EMBODIMENTS

Figure 1:
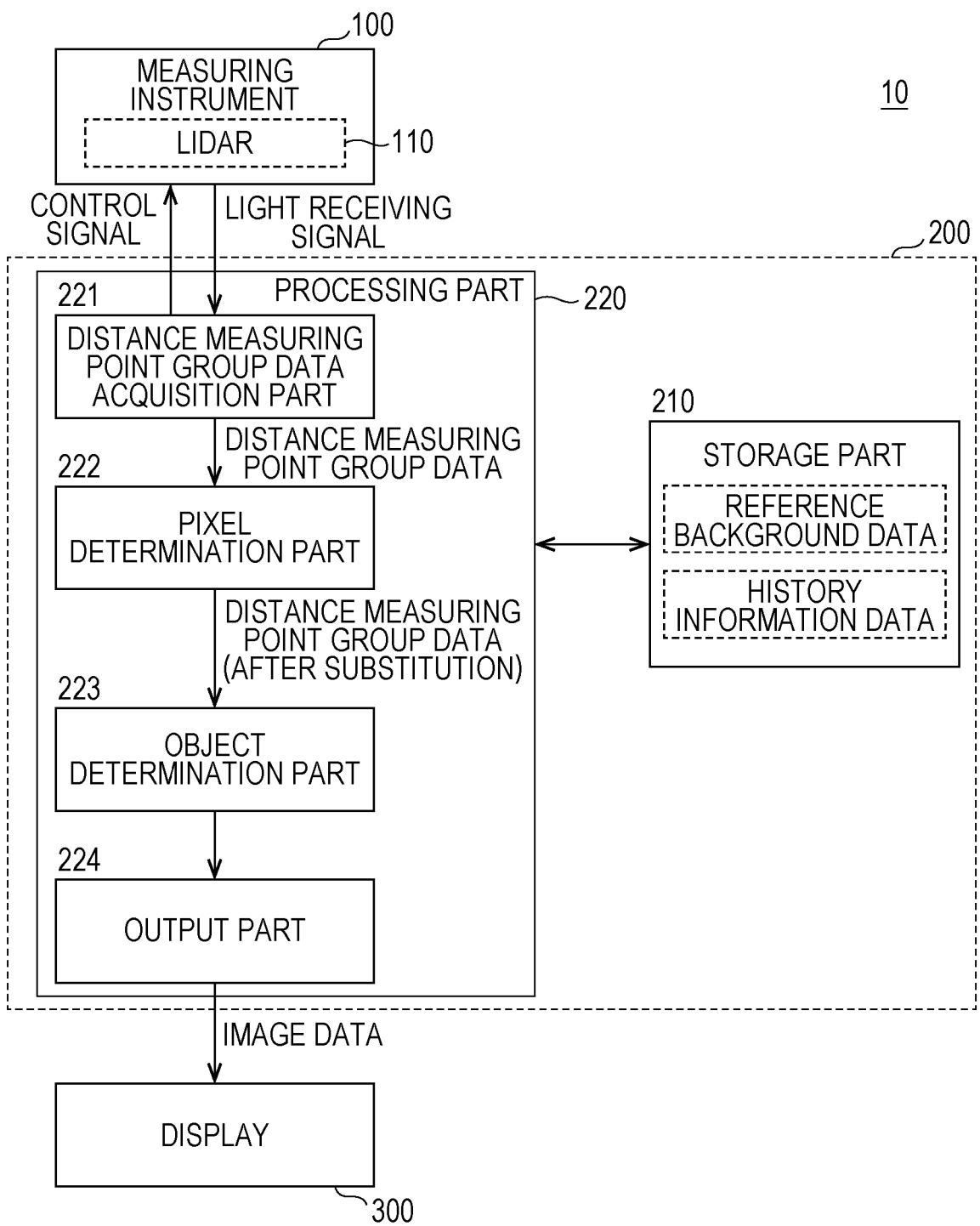
FIG. 1 is a block diagram illustrating a configuration of an object detection system which includes an image processing device according to the present embodiment.

Hereinafter, with reference to the accompanying drawings, embodiments of the present invention will be described. Note that in the description of the drawings, the same components are denoted by the same reference signs and overlapping description is omitted. In addition, for the sake of description, dimension ratios in the drawings are exaggerated and there may be a case where the dimension ratios therein are different from actual ratios.

FIG. 1 is a block diagram illustrating a main configuration of an object detection system 10. The object detection system 10 includes a measuring instrument 100, an image processing device 200, and a display 300. The measuring instrument 100 measures a distance up to an object by a ToF system. More specifically, the distance up to the object is measured based on time intervals from when transmission waves directed in a plurality of orientations are applied toward a measurement space to when reflected waves of these transmission waves from the target object are received. The measuring instrument 100 has a lidar 110 (LiDAR: Light Detection and Ranging) using laser light of, for example, infrared light (approximately 800 nm to 1,000 nm). The lidar 110 is used, thereby allowing the distance up to the object to be measured at high resolution. Note that a millimeter-wave radar using millimeter-wave transmission waves may be adopted, instead of the lidar 110. The display 300 is a liquid-crystal display and displays an image based on distance measuring point group data (described later). Note that a speaker may be included together with the display 300 and when an alert is issued, sound such as warning sound may be outputted.

In the below description, first, the measuring instrument 100 to which the lidar 110 is applied is described and the image processing device 200 is described later.

(Measuring Instrument 100)

Figure 2:
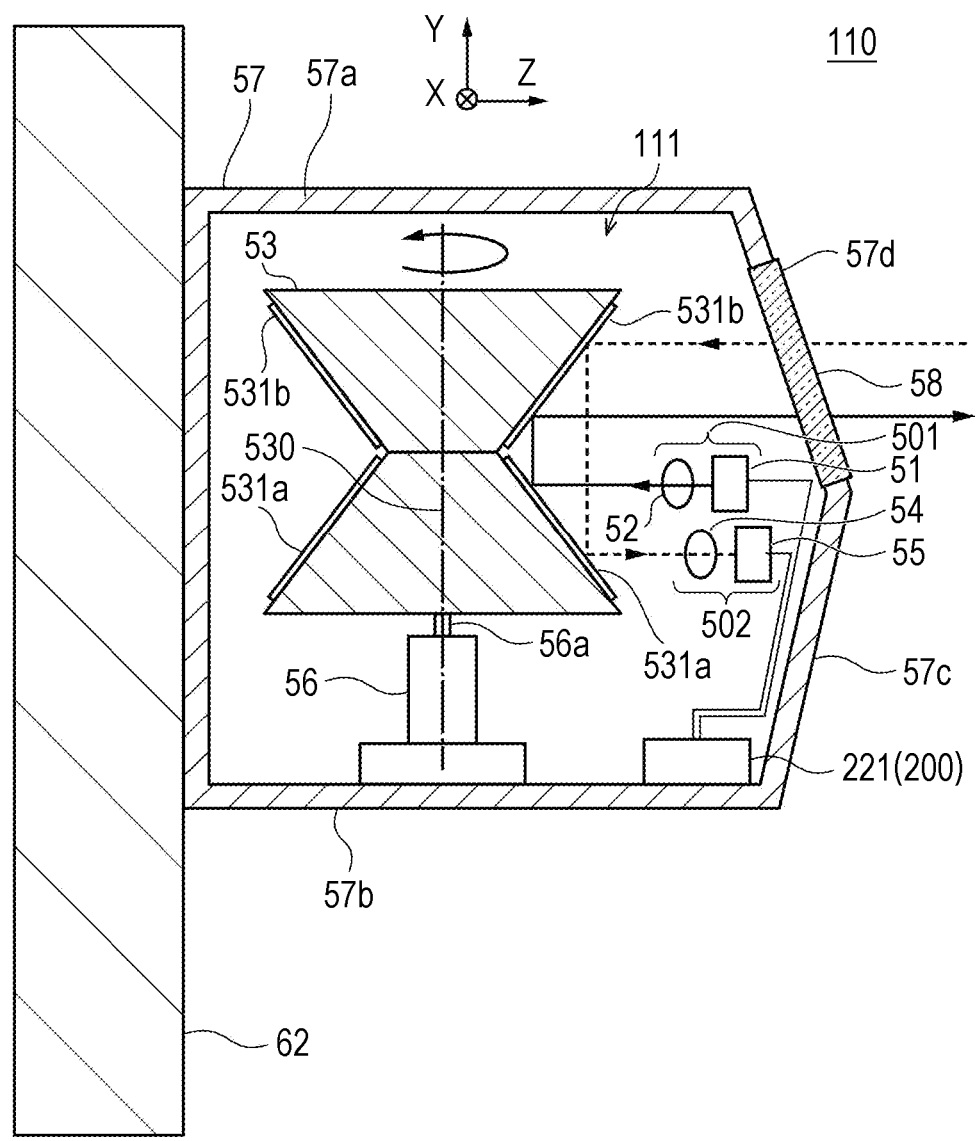
FIG. 2 is a cross-sectional view illustrating a schematic configuration of a lidar.
Figure 3:
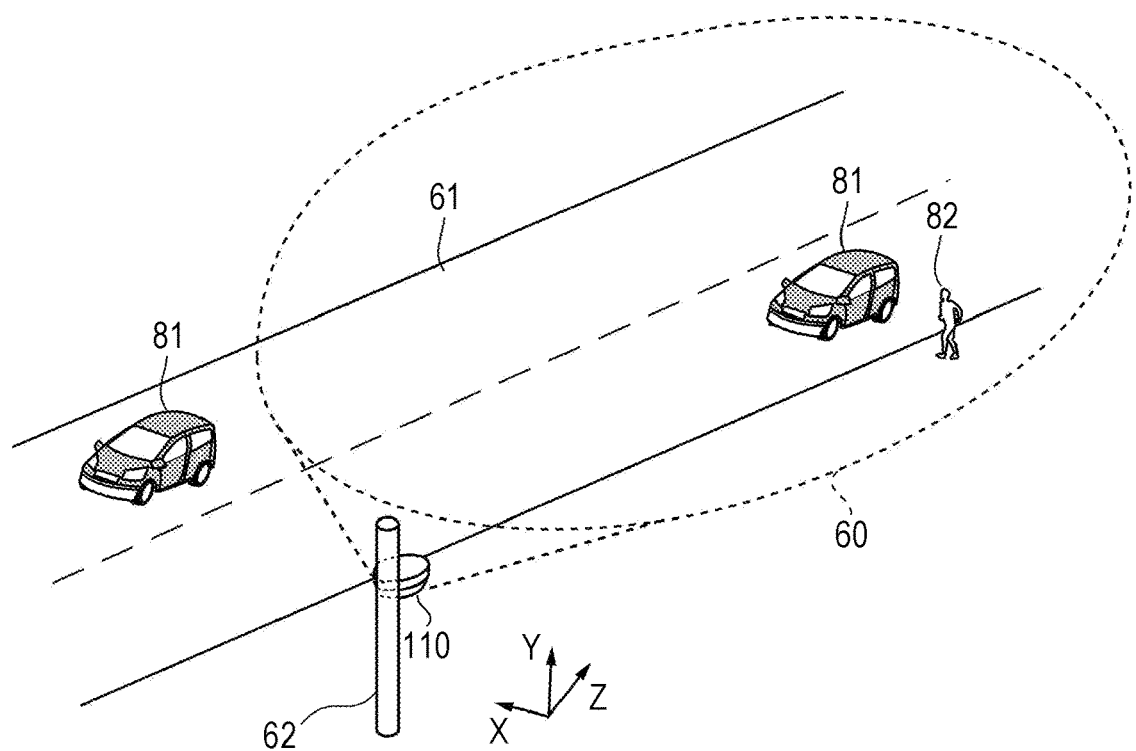
FIG. 3 is a schematic diagram illustrating a state in which the lidar is located in such a way that a space on a road on which a vehicle passes comes to be a measurement space.
Figure 4:
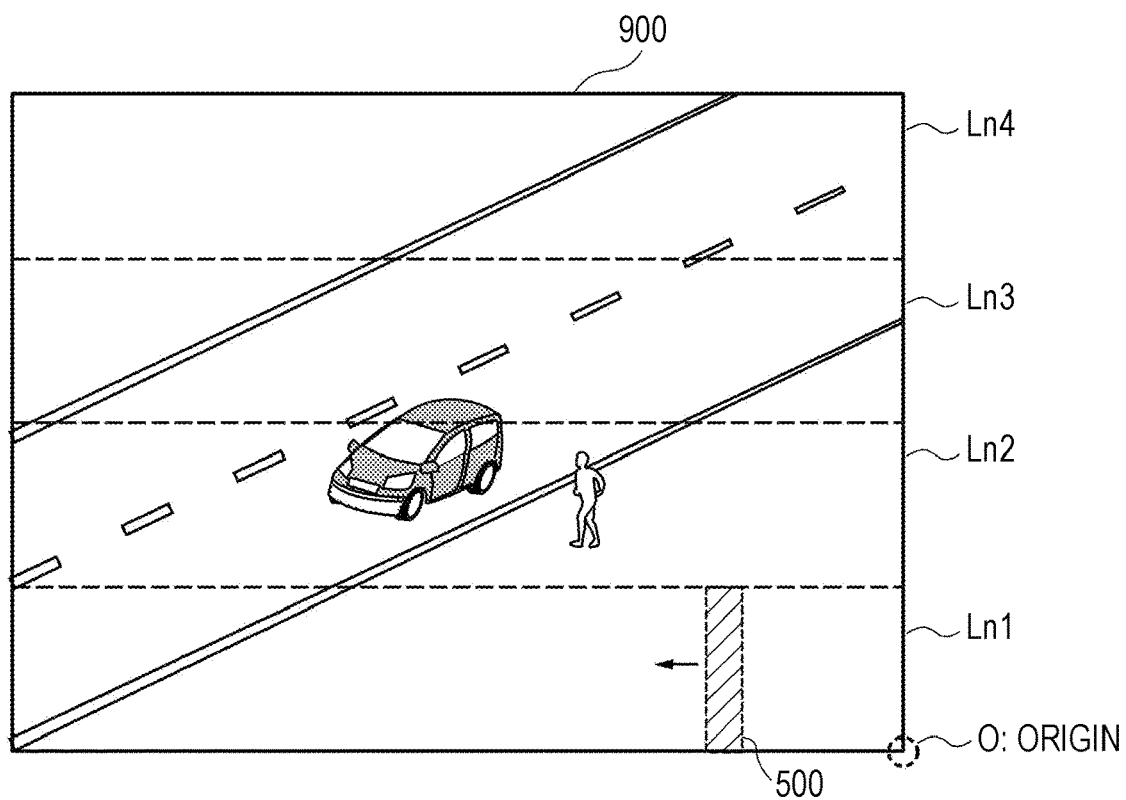
FIG. 4 is a schematic diagram illustrating a state in which an inside of the measurement space is scanned by the lidar.

Hereinafter, with reference to FIGS. 2 to 4, a configuration of the lidar 110 of the measuring instrument 100 will be described. FIG. 2 is a cross-sectional view illustrating a schematic configuration of the lidar 110. FIG. 3 is a schematic diagram illustrating a state in which the lidar is located in such a way that a space on a road comes to be the measurement space. FIG. 4 is a schematic diagram illustrating a state in which an inside of the measurement space is scanned by the lidar 110.

As shown in FIG. 2, the lidar 110 has a light projecting and receiving unit 111. The light projecting and receiving unit 111 has a semiconductor laser 51, a collimating lens 52, a mirror unit 53, a lens 54, a photodiode 55, and a motor 56 as well as a housing 57 which houses these constituting members. Inside the housing 57, a distance measuring point group data acquisition part 221 of the image processing device 200 is located. The light projecting and receiving unit 111 outputs light receiving signals of pixels obtained by scanning the inside of the measurement space of the lidar 110 by laser spot light. Based on these light receiving signals, the distance measuring point group data acquisition part 221 generates the distance measuring point group data. This distance measuring point group data is also referred to as a distance image or a distance map.

The semiconductor laser 51 emits a pulsatile laser light flux. The collimating lens 52 converts divergent light from the semiconductor laser 51 to parallel light. The mirror unit 53 scan-projects the laser light made parallel by the collimating lens 52 toward a measurement area by a rotary mirror surface and reflects reflected light from the target object. The lens 54 collects the reflected light from the target object, which is reflected by the mirror unit 53. The photodiode 55 receives the light collected by the lens 54 and has a plurality of pixels arranged in a Y direction. The motor 56 rotationally drives the mirror unit 53.

The distance measuring point group data acquisition part 221 controls operation of the measuring instrument 100 and generates successive frames (distance measuring point group data) with a predetermined period (for example, several Hz to 20 Hz). Based on time intervals (time differences) each between light emitting timing of the semiconductor laser 51 of the measuring instrument 100 and light receiving timing of the photodiode 55, the distance measuring point group data acquisition part 221 obtains distance information (distance values). The distance measuring point group data acquisition part 221 is constituted of a central processing unit (CPU) and a memory, although by executing a variety of processes by executing the program stored in the memory, the distance measuring point group data acquisition part 221 obtains the distance measuring point group data, the distance measuring point group data acquisition part 221 may include a hardware circuit dedicated for generation of the distance measuring point group data. In addition, the distance measuring point group data acquisition part 221 may be incorporated into an inside of the housing of the later-described image processing device 200 and may be integrated therein in a hardware manner. Note that as other embodiment, the distance measuring point group data acquisition part 221 may simply assume only an input/output function and may acquire the distance measuring point group data generated by the lidar 110.

In the present embodiment, the semiconductor laser 51 and the collimating lens 52 constitute a light emitting part 501 and the lens 54 and the photodiode 55 constitute a light receiving part 502. It is preferable that a light axis of each of the light emitting part 501 and the light receiving part 502 is orthogonal to a rotation axis 530 of the mirror unit 53.

The housing 57 which is fixedly installed on a column 62 or the like, which is a rigid body, and is of a box shape has an upper wall 57a, a lower wall 57b facing the upper wall 57a, and a side wall 57c connecting the upper wall 57a and the lower wall 57b. On a part of the side wall 57c, an opening 57d is formed, and on the opening 57d, a transparent plate 58 is attached.

The mirror unit 53 has a shape obtained by joining and integrating two quadrangular pyramids hind-foremost, that is, has four pairs of mirror surfaces 531a and 531b, each of the pairs inclining in a direction in which the mirror surfaces 531a and 531b face each other in a paired manner (however, the number of the pairs is not limited to four). It is preferable that the mirror surfaces 531a and 531b are formed by vapor-depositing reflection film on a surface of a resin material (for example, PC (polycarbonate)) having a shape of the mirror unit.

The mirror unit 53 is coupled to a shaft 56a of the motor 56, which is fixed to the housing 57, and is rotationally driven. Although in the present embodiment, for example, with the mirror unit 53 attached onto the column 62, an axis line (rotation axis) of the shaft 56a extends in a Y direction which is a vertical direction and an XZ plane constituted of an X direction and a Z direction, which are orthogonal to the Y direction, is a horizontal plane, the axis line of the shaft 56a may be inclined with respect to the vertical direction.

Next, a principle of target object detection of the lidar 110 will be described. In FIG. 2, the divergent light emitted from the semiconductor laser 51 in a pulsatile and intermittent manner is converted to a parallel light flux by the collimating lens 52 and the parallel light flux enters a first mirror surface 531a of the rotating mirror unit 53. Thereafter, the parallel light flux is reflected by the first mirror surface 531a and is further reflected by a second mirror surface 531b, and thereafter, the parallel light flux penetrates the transparent plate 58 and is scan-projected toward an outside measurement space, for example, as laser spot light (FIG. 4) of a plurality of laser light fluxes, each of which has a vertically long rectangular cross-section as a whole. Note that a direction in which the laser spot light is emitted and a direction in which the emitted laser spot light is reflected by the target object and returns as reflected light overlap each other, these overlapping two directions are referred to as a light projecting and receiving direction. The laser spot light traveling in the same light projecting and receiving direction is detected by the same pixels.

FIG. 3 is a schematic diagram illustrating a state in which the lidar 110 is located in such a way that a space on a road 61 on which the vehicle runs comes to be a measurement space 60. The lidar 110 is located on an upper portion of the column 62 in such a way as to face toward the road 61. On the road 61 inside the measurement space 60, objects (moving objects) 81 and 82 are present. In an example illustrated in FIG. 3, the object 81 is a vehicle (ordinary passenger car) and the object 82 is a pedestrian.

FIG. 4 is a diagram illustrating a state in which in accordance with rotation of the mirror unit 53, the inside of the measurement space 60 as illustrated in FIG. 3 is scanned by the emitted laser spot light 500 (illustrated by hatching). The light projecting and receiving unit 111 is located in such a way as to be turned upside down and sequentially performs scanning, with an origin O in the lower right as a scanning start point, toward the upper left. Here, in combinations of the paired mirrors (the first mirror surface 531a and second mirror surface 531b) of the mirror unit 53, crossing angles of the four pairs are difference from one another. The laser light is sequentially reflected by the rotating first mirror surface 531a and second mirror surface 531b. First, in accordance with the rotation of the mirror unit 53, laser light reflected by the first mirror surface 531a and the second mirror surface 531b of a first pair scans a lowermost region Ln1 of the measurement space from the right to the left in a horizontal direction (also referred to as a "main scanning direction"). Next, in accordance with the rotation of the mirror unit 53, laser light reflected by the first mirror surface 531a and the second mirror surface 531b of a second pair scans a second region Ln2 of the measurement space from the bottom from the right to the left in the horizontal direction. Next, in accordance with the rotation of the mirror unit 53, laser light reflected by the first mirror surface 531a and the second mirror surface 531b of a third pair scans a third region Ln3 of the measurement space from the bottom from the right to the left in the horizontal direction. Next, in accordance with the rotation of the mirror unit 53, laser light reflected by the first mirror surface 531a and the second mirror surface 531b of a fourth pair scans an uppermost region Ln4 of the measurement space from the right to the left in the horizontal direction. Thus, scanning of the whole measurement space, which the lidar 110 can measure, performed once, is completed. By combining images obtained by scanning of these regions Ln1 to Ln4, one frame 900 can be obtained. After the mirror unit 53 has rotated once, again, by returning to the first mirror surface 531a and the second mirror surface 531b of the first pair and subsequently, repeating the scanning of the lowermost region Ln1 to the uppermost region Ln4 of the measurement space (this lower to upper direction is also referred to as a sub-scanning direction), the next frame 900 can be obtained.

In FIG. 2, among the scan-projected light fluxes, a part of the laser light which hits the target object and is reflected penetrates the transparent plate 58 again and enters the second mirror surface 531b of the mirror unit 53 inside the housing 57 and is reflected there. Thereafter, this laser light is further reflected by the first mirror surface 531a, is collected by the lens 54, and is detected by a light receiving surface of the photodiode 55 for each pixel. Furthermore, in accordance with a time difference between the light emitting timing of the semiconductor laser 51 and the light receiving timing of the photodiode 55, the distance measuring point group data acquisition part 221 obtains the distance information. Thus, the target object is detected in the whole area within the measurement space 60 and the frame as the distance measuring point group data having the distance information for each pixel can be obtained. In addition, the previously measured and obtained distance measuring point group data, in response to an instruction of a user, is stored as reference background data in a memory (the later-described storage part 210) of the image processing device 200.

(Image Processing Device 200 of Object Detection System 10)

With reference to FIG. 1 again, components of the image processing device 200 will be described. The image processing device 200 is, for example, a computer and includes a central processing unit (CPU), a memory (a semiconductor memory and a magnetic recording medium (a hard disk or the like)), an input/output part (a display, a keyboard, and the like), a communication interface (I/F), and the like. The communication I/F is an interface for communicating with an external apparatus. For the communication, a network interface in conformity with standards such as Ethernet (registered trademark), SATA, PCI Express, USB, IEEE1394, or the like may be used. In addition, for the communication, a wireless communication interface such as Bluetooth (registered trademark), IEEE802.11, and 4G may be used.

As shown in FIG. 1, the image processing device 200 has the storage part 210 and a processing part 220. This processing part 220 has the distance measuring point group data acquisition part 221, a pixel determination part 222, an object determination part 223, and an output part 224.

(Storage Part 210)

The storage part 210 is constituted of a semiconductor memory and a magnetic recording medium (a hard disk or the like) and has stored therein the reference background data of one frame and history information data of a plurality of frames obtained in a previous time or the distance measuring point group data.

A method of generating the reference background data will be described. As preliminary preparation (preprocessing) of the measurement, in response to an instruction of a user, in a state in which moving objects such as a vehicle and an animal are not present, scanning by the laser spot light is performed from the lidar 110. Thus, based on reflected light obtained from a background target object (a stationary object), the reference background data can be generated. In addition, the smallest value among distance values of pixels obtained by the plurality of frames obtained during a predetermined period of time is defined as a maximum distance value of the pixels. When this maximum distance value is larger than distance values of pixels of the reference background data, the reference background data may be updated by using this maximum distance value.

As to the history information data, pixels of one frame (distance measuring point group data) are determined (classified) by the later-described pixel determination part 222, and determination results are stored as the history information data in the storage part 210 by a unit of a frame. It is only required for the history information data of at least immediately previous one frame to be available, and each time distance measuring point group data of the past one frame is acquired and these pixels thereof are determined, the distance measuring point group data is updated to the latest data.

(Processing Part 220)
(Distance Measuring Point Group Data Acquisition Part 221)

The function of the distance measuring point group data acquisition part 221 is as described above. The distance measuring point group data acquisition part 221 outputs a control signal upon measuring, causes the light projecting and receiving unit 111 of the lidar 110 to apply transmission waves toward a plurality of irradiation directions throughout the measurement space 60, and acquires receiving signals in accordance with reflected waves of the transmission waves from the object (target object) inside the measurement space 60. In accordance with reception timing of the receiving signals (time intervals between transmission and reception), pieces of distance information thereof in the plurality of irradiation directions are obtained. Thus, the distance measuring point group data is generated.

In addition, in the pieces of this distance measuring point group data, identifiers which indicate that pixels cannot be measured are embedded. Specifically, when reflected waves having sufficient amounts (light amounts) (sufficient energy) in a case where a distance up to the object is extremely large (also referred to as "infinity") or a case where a surface thereof is a mirror surface or is glossy black cannot be detected and distance values cannot be thereby obtained, as to pixels whose distance values are not obtained, common identifiers (also referred to as "tag values") which indicate that the distance values cannot be obtained as the distance values are embedded. Hereinafter, each of the pixels for which the above-described identifiers are embedded is simply referred to as "infinity" or an "infinity pixel". When the distance values of the pixels are represented in two bytes, as an identifier which indicates that each of the distance values cannot be obtained, a maximum value "FFFF" is used.

(Pixel Determination Part 222)

The pixel determination part 222 determines kinds of the pixels of the distance measuring point group data which the distance measuring point group data acquisition part 221 acquires and in accordance with a determination result, substitutes distance values of neighboring or surrounding pixels therefor. Specifically, as to the pixels of the distance measuring point group data, the pixel determination part 222 references background image data or together with the background image data, distance measuring point group data of a temporally previous frame. The pixels which constitute the distance measuring point group data are pixels targeted for the determination and are determined as any of the below-described (1) background pixels, (2) foreground pixels, (3) infinity background pixels, (4) pixels with substitution, and (5) pixels without substitution. In addition, the determination result is stored as the history information data in the storage part 210 by a unit of a frame. The determination conditions (1) to (5) are as follows.

(1) The "background pixels" are pixels in a case where distance values of the pixels are equivalent to distance values of pixels of the background image data (hereinafter, also simply referred to as "background distance values"). In addition, when a state in which the distance values of the pixels indicate that distances are more remote than the background distance is continued at predetermined times or more (a predetermined time period or more), by substituting distance values of pixels on a remote side for the distance values of the pixels of the background image data, the background image data may be sequentially updated.

(2) The "foreground pixels" are pixels in a case where distance values of the pixels are finite values (not identifiers of infinity) and are smaller than the background distance values.

(3) The "infinity background pixels" are pixels in a case where background pixel values and distance values of the pixels are identifiers of infinity.

(4) The "pixels with substitution" are determined as the pixels with substitution in a case where determination of the following conditions (i) to (iii) is performed and all of the conditions (i) to (iii) are satisfied. The condition (i): distance values of pixels are identifiers of infinity which indicate that distance values cannot be obtained;

The condition (ii): distance values of the reference background data corresponding to pixels targeted for determination processing are not identifiers of infinity; and The condition (iii): distance values of neighboring pixels, which neighbor pixels targeted for determination, are smaller than distance values of the reference background data corresponding to the neighboring pixels (that is, are foreground pixels). In addition, further, a condition (iv): it is determined that as to the distance measuring point group data of a temporally previous frame, (distance values of) pixels corresponding to pixels targeted for determination are not identifiers (infinity), and in a case where all of the conditions (i) to (iv) are satisfied, the determination as the pixels with substitution may be made (the later-described second embodiment).

Note that as this temporally previous frame, an immediately preceding frame may be used, any of frames within a range of a predetermined period of time after a frame (at the present time) targeted for determination may be used, or a plurality of frames may be used. The predetermined period of time is set, thereby enabling quick application in a case where a road surface has changed.

(5) The "pixels without substitution" are pixels in a case where the condition (iii) is not satisfied and the conditions (i) and (ii) other than the condition (iii) are satisfied.

FIG. 5 is a table showing the determination conditions of the pixels and determination results. In FIG. 5, encircles numbers 1 to 5 correspond to the above-described (1) to (5).

In addition, as to pixels which are determined to correspond to (4) the "pixels with substitution", the pixel determination part 222 performs, by using any distance values of the foreground pixels among neighboring pixels or an average value of these distance values, processing of embedding (substituting) the above-mentioned distance values in the pixels which are classified as the pixels with substitution. For example, by using distance values (or an average value of these distance values) of pixels which are the foreground pixels among pixels which neighbor pixels targeted for determination in four directions or distance values (an average value of these distance values) of the pixels which are close to the origin 0 among the pixels which are the foreground pixels and neighbor in the four directions, the substitution is performed. Note that in the condition (iii) as to the neighboring pixels in the determination condition (4) of the pixels with substitution, not only a case where these neighboring pixels are determined to be the foreground pixels by actually measured values but also a case where (4) the neighboring pixels are determined to be the pixels with substitution as a determination result and distance values corresponding to the foreground are substituted (recursive substitution processing) are included. A specific example of the substitution processing will be described later. Note that the present invention is not limited to the neighboring pixels and distance values of pixels surrounding the pixels targeted for determination may be used. Specifically, the substitution is performed by using an average value of distance values of foreground pixels among pixels surrounding from pixels targeted for pixel determination to within a predetermined distance (pixel number distance).

(Object Determination Part 223)

The object determination part 223 recognizes an object within the measurement space 60 by using the distance measuring point group data for which substitution processing is performed by the pixel determination part 222. In the present embodiment, for example, a background differencing technique is adopted. In this background differencing technique, background image data (also referred to as reference background data) previously generated and stored in the storage part 210 is used.

The object determination part 223 has a function to recognize a moving object. In a case where by comparing the background image data held in the storage part 210 and distance measuring point group data at the present time, there is a difference, the object determination part 223 can recognize that any moving object (an object in the foreground) such as a vehicle appears in the measurement space 60. For example, the background image data and the distance measuring point group data (distance image data) at the present time are compared by using the background differencing technique, thereby extracting the foreground data. Pixels (a pixel group) of the extracted foreground data are divided into clusters in accordance with, for example, distance values of the pixels. A size of each of the clusters is calculated. For example, a dimension in a vertical direction, a dimension in a horizontal direction, a total area, and the like are calculated. Note that the "size" referred to herein is actual dimensions and is different from a seeming magnitude (an angle of view, that is, a spread of pixels), and a mass of a pixel group is determined in accordance with a distance up to the target object. For example, the object determination part 223 determines whether or not the calculated size is be equal to or less than a predetermined size threshold value for identifying a moving object as an analysis target of an extraction target. The size threshold value can be set in any manner in accordance with a measurement location, a behavior analysis target, or the like. When a vehicle or a person is tracked and behavior is analyzed, it is only required to set a minimum value of sizes of the vehicle or the person as the size threshold value in a case of clustering. Thus, rubbish such as fallen leaves and plastic bags or small animals can be excluded from detection targets. In particular, in the present embodiment, even in a case where a vehicle such as a black vehicle which is difficult to detect passes through the measurement space 60, a distance of a body of the vehicle cannot be measured, and distance values thereof are distance values (identifiers) of infinity, the substitution processing by the pixel determination part 222 can be performed. Thus, since the substitution is performed by the distance values of the neighboring foreground pixels, by clustering the distance values after the substitution, a mass which is equivalent to an original size of a main body of the vehicle can be recognized, thereby preventing the vehicle from being excluded from the detection targets as with the rubbish and the small animals and enabling correct recognition.

In addition, the object determination part 223 performs at least one of entering determination of an object into a predetermined area (for example, a detection area set on the road 61) within the measurement space; counting of objects passing through this predetermined area; and determination of a movement locus of an object. In addition, these kinds of determination may be performed by determining a kind of an object and performing determination for each determined kind thereof. For example, as these kinds, there are a standard-sized vehicle, a large-sized vehicle (a truck and the like), and a two-wheeled vehicle. This kind determination is performed, for example, by conducting matching with characteristics (a size and a shape) of each of the kinds, which are previously stored in the memory of the image processing device 200. In addition, this kind determination algorithm may be previously machine-learned by the heretofore known algorithm. This machine learning is implemented in advance by using an enormous amount of data and a high-performance computer, thereby determining parameters. By using the determined parameters, the object determination part 223 determines each of the kinds (Output Part 224)

The output part 224 creates image data for displaying by using the distance measuring point group data and outputs the created image data to the display 300. In addition, the output part 224 may output a count value of the object or objects, the movement locus or loci, the entering determination, performed by the object determination part 223, thereto. In addition, an alert may be outputted by the entering determination. The outputting of the alert includes providing the outputted image data with a warning message and outputting of warning sound from the speaker. In addition, the output part 224 may provide an object determined by the object determination part 223 with a detection frame. Furthermore, in the image data outputted by the output part 224, by referencing the history information data, the pixels with substitution may be displayed in a manner in which the pixels with substitution are identifiable from other pixels.

(Image Processing in First Embodiment)

With reference to FIGS. 6 to 9, image processing executed by the image processing device 200 according to the first embodiment will be described. FIGS. 6, 7A, and 7B are flowcharts each showing the image processing executed by the processing part 220 of the image processing device 200. Note that encircled numbers 1 to 5 (for example, an encircled number 3 in step S105) in the flowcharts correspond to the encircled numbers 1 to 5 in the table in FIG. 5 (encircled numbers 1 to 6 in FIG. 10 also correspond to encircled numbers 1 to 6 in a table in FIG. 11).

(Step S10)

As shown in FIG. 6, first, the distance measuring point group data acquisition part 221 causes the lidar 110 to perform measurement (scanning) in an inside of the measurement space 60. The distance measuring point group data acquisition part 221 obtains respective distance values in a plurality of irradiation directions from timing of receiving signals obtained by the lidar 110. From these, the distance measuring point group data acquisition part 221 generates distance measuring point group data indicating distribution of the distance values of the pixels (directions) and outputs the distance measuring point group data. This is repeated at a predetermined period (several tens msec), thereby obtaining successive frames. In addition, in this distance measuring point group data, as to pixels in which a sufficient amount of reflected light cannot be obtained due to a black vehicle body or the like and distance values cannot be thereby obtained, common identifiers (for example, "FFFF") indicating infinity as distance values are embedded.
(Step S11)

Figure 7A:
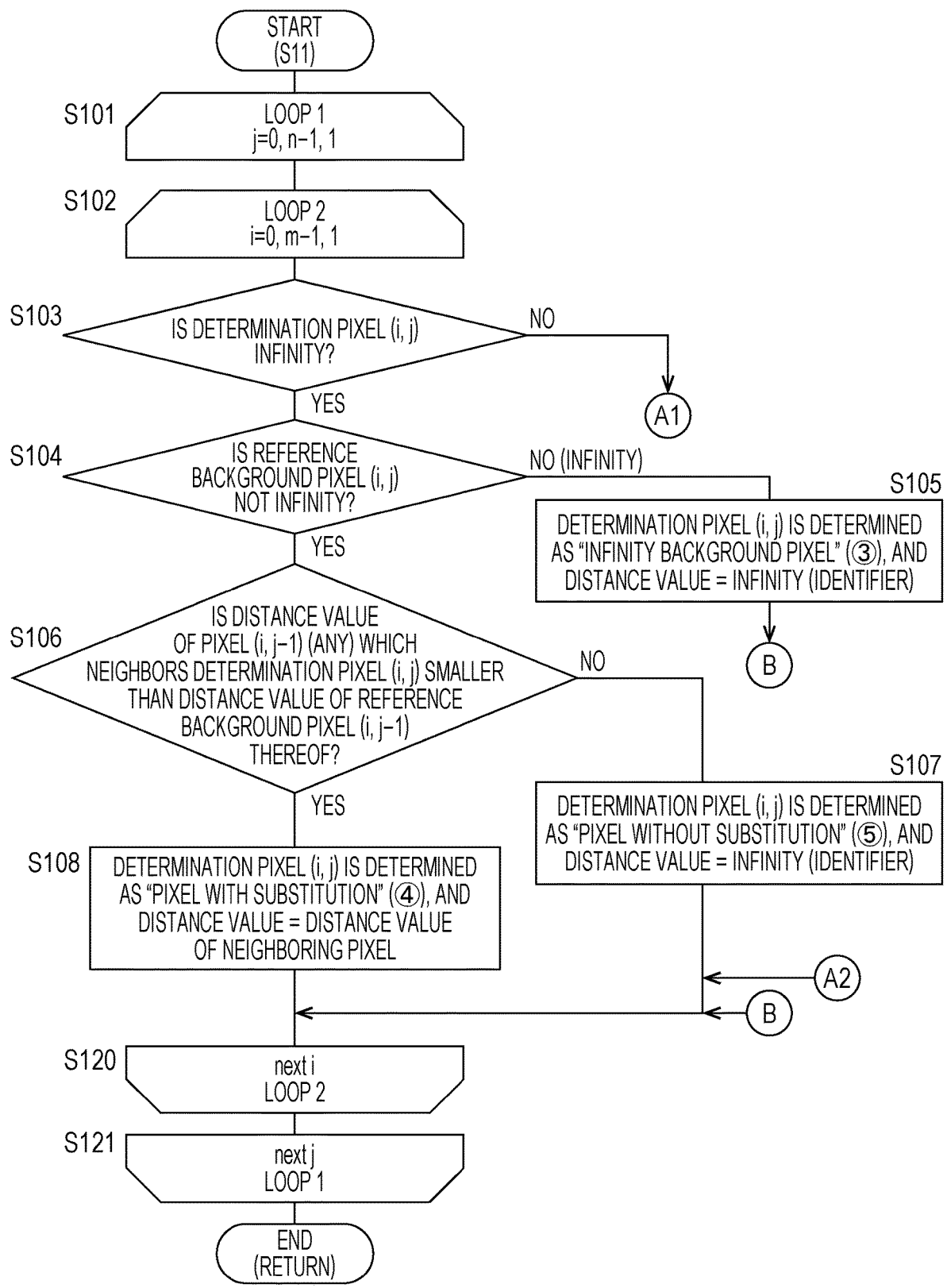
FIG. 7A is a subroutine flowchart illustrating pixel substitution processing in step S11 in FIG. 6.
Figure 7B:
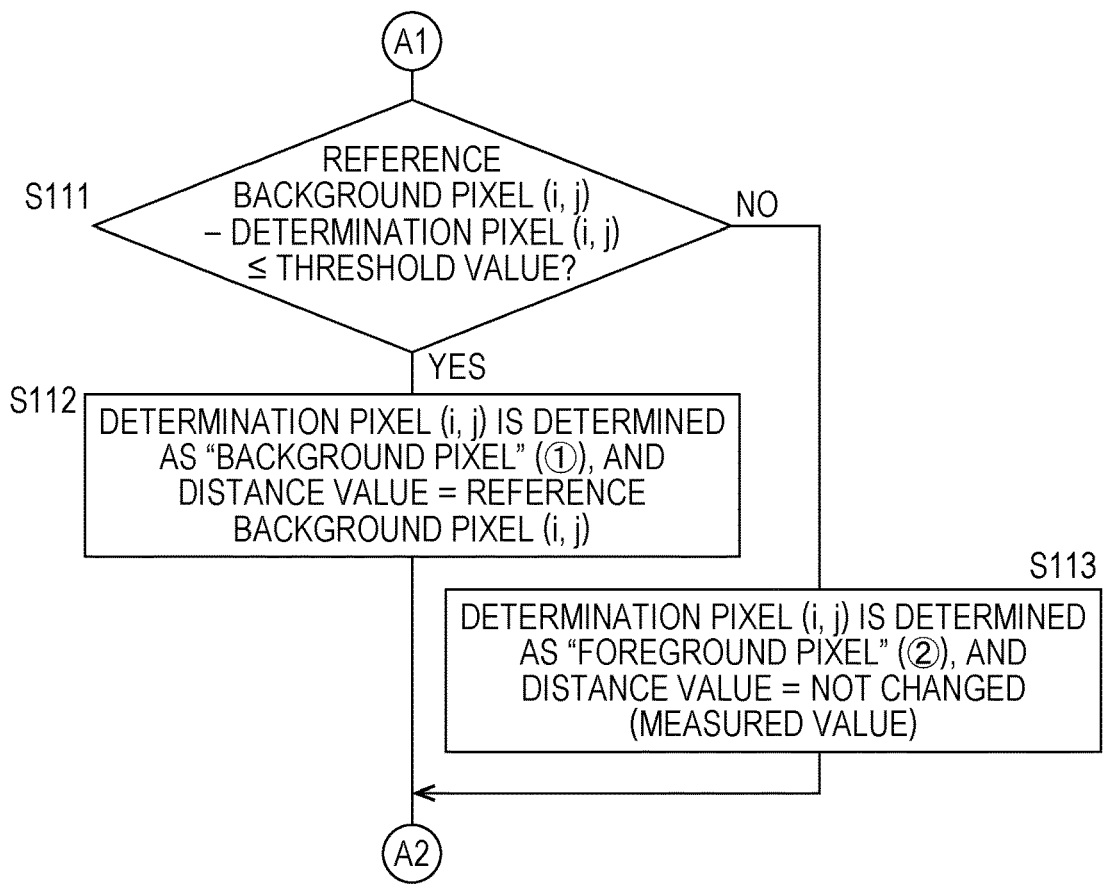
FIG. 7B is a subroutine flowchart illustrating processing subsequent to the subroutine shown in FIG. 7A.

The pixel determination part 222 of the processing part 220 performs substitution processing of pixels of the distance measuring point group data acquired in step S10. FIGS. 7A and 7B are subroutine flowcharts in step S11.
(Steps S101 and S102)

Figure 8:
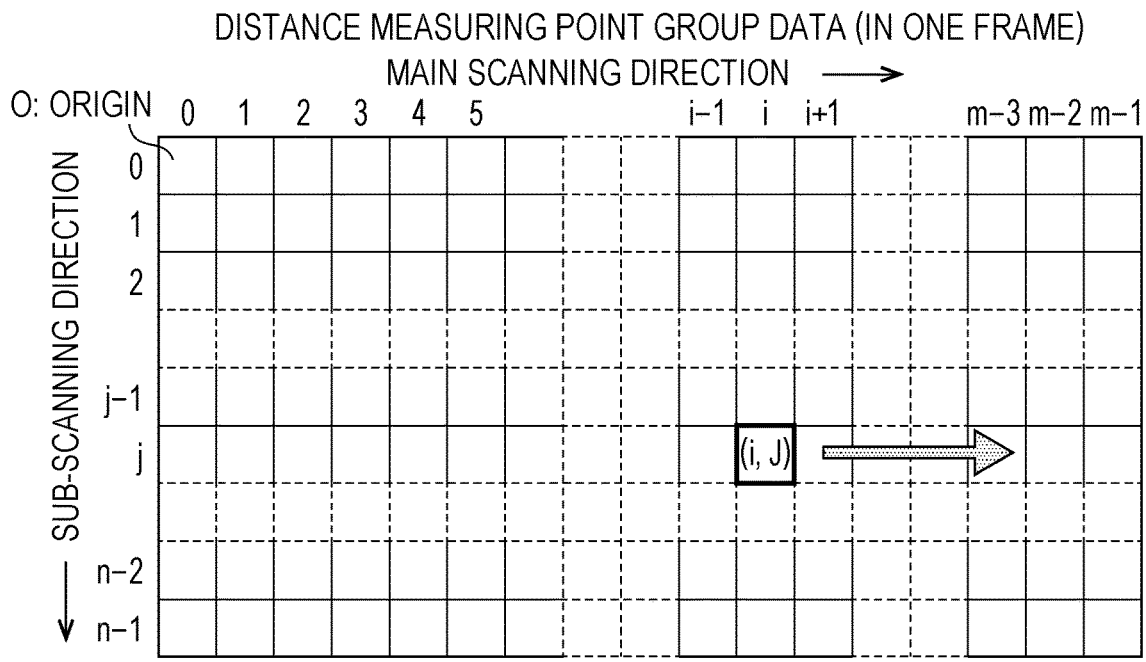
FIG. 8 is a schematic diagram illustrating a configuration of distance measuring point group data and order of processing pixels.

As shown in FIG. 8, the pixel determination part 222 sequentially sets the pixels as determination targets in steps S101 and S102 and performs loop processing.

FIG. 8 is a schematic diagram showing a structure of an array of the distance measuring point group data in one frame and order of processing the pixels. An origin O in FIG. 8 corresponds to the origin O in FIG. 4, and in FIG. 8, a top-to-bottom direction turned upside down in FIG. 4 is shown in such a way as to be restored to an original direction. Note that the below description is given with directions shown in FIG. 8 as references of upper, lower, right, and left directions. For example, it is described that the origin O is described as an uppermost and leftmost pixel.

As shown in FIG. 8, in the distance measuring point group data of one frame, pixels whose number is m from zero to m−1 are arranged in a main scanning direction (hereinafter, also referred to as a horizontal direction), and pixels whose number is n from zero to n−1 are arranged in a sub-scanning direction (hereinafter, also referred to as a vertical direction). A total number of pixels is n×m and for example, is several thousands. Note that the reference background data and the history information data, which are stored in the storage part 210, are also configured by an array having the same size as that shown in FIG. 8.

Between steps S101 and S121, processing of a loop 1 is performed. A variable of the loop 1 is j, an initial value is zero, and the processing is repeated at n times by conducting incrementing by one in a sub-scanning direction until a final value n−1.

Similarly, between steps S102 and S120, processing of a loop 2 is performed. A variable of the loop 2 is i, an initial value is zero, and the processing is repeated at m times by conducting incrementing by one in a main scanning direction until a final value m−1. Note that hereinafter, pixels (i, j) targeted for the loop processing are referred to as "determination pixels" (also referred to as "determination target pixels").
(Step S103)

The pixel determination part 222 determines whether or not a distance value of the determination pixel (i, j) indicates infinity, that is, is an identifier. When the distance value thereof indicates the infinity (YES), the processing proceeds to step S104, and when the distance value thereof does not indicate the infinity (NO), the processing proceeds to step S111 in FIG. 7B (a sign A1).
(Step S111)

The pixel determination part 222 compares a pixel of the reference background data of a position corresponding to the determination pixel (i, j) (hereinafter, referred to as a "reference background pixel (i, j)") and the determination pixel (i, j).

Reference Background Pixel(i,j)−Determination Pixel (i,j)<Threshold Value* (1)

Specifically, the pixel determination part 222 determines whether or not an expression (1) is satisfied, and when the expression (1) is satisfied (YES), the processing proceeds to step S112, and when the expression (1) is not satisfied (NO), the processing proceeds to step S113. This threshold value is a positive numerical value close to zero in consideration of a measurement error level.
(Step S112)

The pixel determination part 222 determines the determination pixel (i, j) as (1) a "background pixel" and substitutes a distance value of the reference background pixel (i, j) for the distance value. This case is a case where as to the determination pixel (i, j), a distance value close to that of the reference background pixel (i, j) or a distance value slightly distant from this due to an error is detected as a distance value of the determination pixel (i, j) before the substitution.
(Step S113)

The pixel determination part 222 determines the determination pixel (i, j) as (2) a "foreground pixel". In this case, the substitution of the distance value is not performed, and a measured distance value is used as it is.
(Step S104)

In step S104 in FIG. 7A, the pixel determination part 222 determines whether or not a distance value of the reference background pixel (i, j) corresponding to the determination pixel (i, j) is a value indicating infinity When the distance value is not the value indicating the infinity (YES), the processing proceeds to step S106, and when the distance value is the value indicating the infinity (NO), the processing proceeds to step S105.
(Step S105)

In this case, since both of the distance values of the determination pixel (i, j) and the reference background pixel (i, j) corresponding thereto remain as the values indicating the infinity (identifiers), the pixel determination part 222 determines the determination pixel (i, j) as (3) an "infinity background pixel" and does not perform the substitution processing, and the distance values remain as values indicating the infinity.
(Step S106)

The pixel determination part 222 determines whether or not distance values of a pixel (i, j−1) and a pixel (i−1, j) neighboring the determination pixel (i, j) are smaller than distance values of a reference background pixel (i, j−1) and a reference background pixel (i−1, j), that is, whether or not the distance values of the pixel (i, j−1) and the pixel (i−1, j) are distance values of foreground pixels. When the distance values of the pixel (i, j−1) and the pixel (i−1, j) are smaller than the distance values of the reference background pixel (i, j−1) and the reference background pixel (i−1, j) (YES), the processing proceeds to step S108, and when the distance values of the pixel (i, j−1) and the pixel (i−1, j) are not smaller than the distance values of the reference background pixel (i, j−1) and the reference background pixel (i−1, j) (NO), the processing proceeds to step S107. Note that in the array shown in FIG. 7, there are four pixels in total which neighbor the determination pixels (i, j) and are one upper pixel, one lower pixel, one right pixel, and one left pixel. In the present embodiment, among the above-mentioned four pixels, neighboring pixels on an upstream side of the processing in steps S103 to S108 and the processing in steps S111 to S112 as processing order, that is, the pixel (i, j−1) and the pixel (i−1, j) which neighbor the determination pixels (i, j) on an upper side and a left side in FIG. 7 are targeted for the determination in step S106. In this way, the determination as (4) "pixels with substitution" is made by a determination result of the neighboring pixels whose processing order is on the upstream side, and in a case where substitution to the distance values corresponding to the foreground is made, by making the determination by using the distance values of the neighboring pixels after the substitution, recursive substitution processing (step S108) is enabled and successive substitution processing of pixels is enabled.

(Step S107)

The pixel determination part 222 determines the determination pixel (i, j) as (5) a "pixel without substitution" and does not perform the substitution processing, and the distance value remains as a value indicating infinity (identifier).

(Step S108)

The pixel determination part 222 determines the determination pixel (i, j) as (4) a "pixel with substitution" and performs the substitution processing. Distance values used at this time are the distance values (average value) of the neighboring pixels on the upper side and the left side which are determined in step S106.

(Steps S120 and S121)

While the determination pixel (i, j) is being moved by the processing of the loop 2 and the processing of the loop 1, the processing in steps S103 to S108 and the processing in steps S111 to S113 are repeated. These processing in steps S103 to S108 and processing in steps S111 to S113 are performed at predetermined times and the determination of all pixels of one frame is finished, thereby finishing the processing of the subroutine flowchart and returning to the main processing shown in FIG. 6 (end (return)).

(Step S12)

Here, the object determination part 223 recognizes an object by using the distance measuring point group data obtained after processing the substitution made by the pixel determination part 222 in step S11. At this time, as described above, determination as to kinds of objects (a vehicle and a pedestrian) may be performed.

(Step S13)

The object determination part 223 performs control processing for the object recognized in step S12. As this control processing, for example, as described above, there are the entering determination of the recognized object into the predetermined area, the locus or loci determination, and counting of the object or objects which have passed therethrough.

(Step S14)

The output part 224 references the determination result made by the object determination part 223, generates image data for displaying from the distance measuring point group data, and causes the display 300 to display the generated image data. In addition, the output part 224 references the history information data of the determination result stored in the storage part 210, generates image data in a manner in which the pixel with substitution are identifiable from the other pixels, and causes the display 300 to display the generated image data.

Figure 9A:
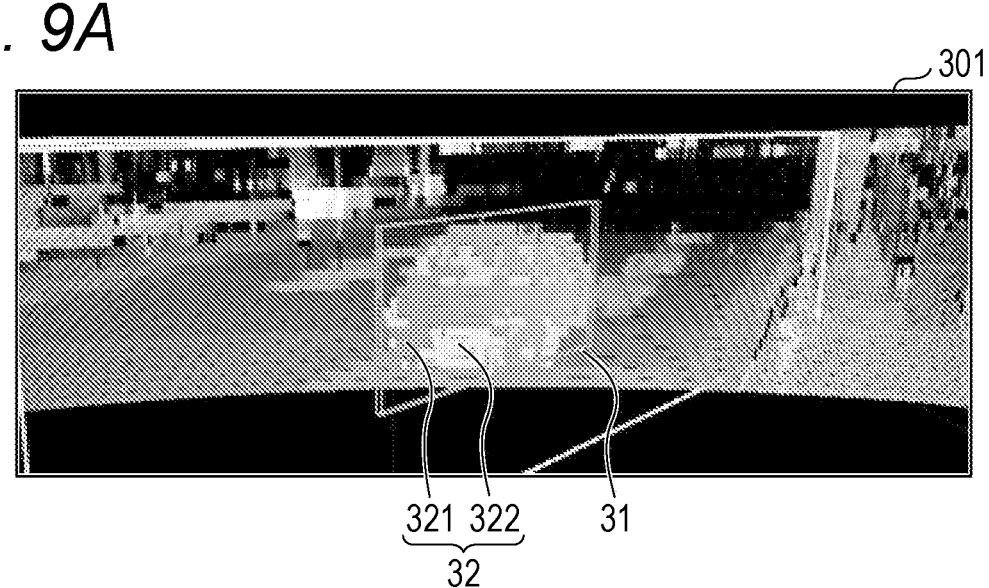
FIGS. 9A and 9B are examples to a display in which pixels with substitution are displayed in a discriminated manner.
Figure 9B:
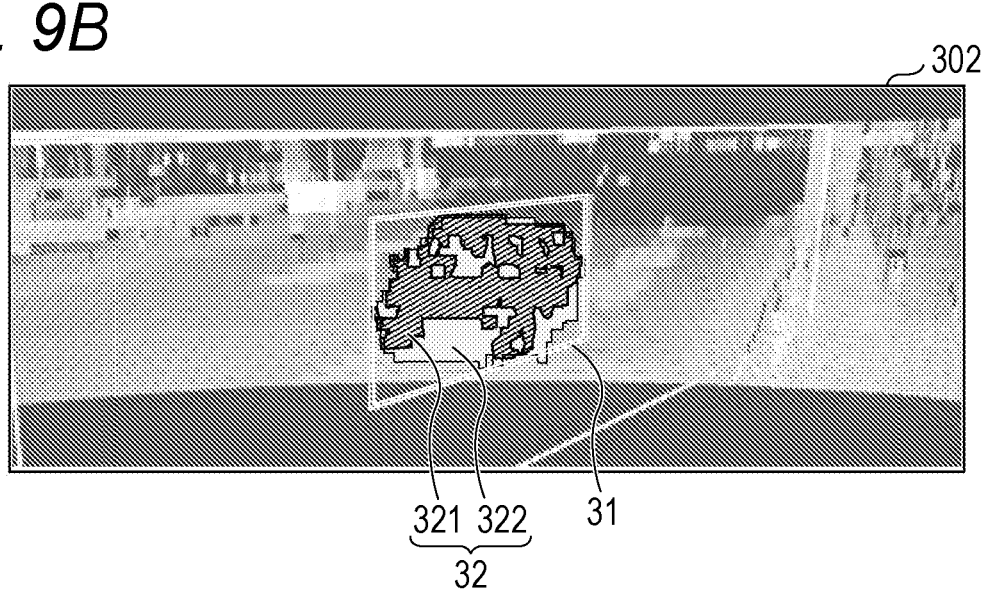

FIG. 9 is a display example onto the display, in which the pixels with substitution are identified therefrom. FIG. 9A illustrates an example of an actual display image 301. Around a recognized object 32, a detection frame 31 is provided. In addition, the object 32 is displayed in such a way that among pixels constituting an image of the object, pixels with substitution 321 are identified from pixels 322 other than the pixels with substitution. For example, by differentiating colors or densities of the pixels with substitution 321 and the pixels 322 from each other in the display image 301, the pixels with substitution 321 and the pixels 322 can be displayed in an identified manner. FIG. 9B illustrates an example of another display image 302 using the same distance measuring point group data as that used in FIG. 9A. In FIG. 9B, as a display manner, patterns (hatching) of pixels with substitution 321 and pixels 322 are differentiated. As in this FIG. 9A or FIG. 9B, by displaying the pixels with substitution in the identified manner, a user who sees this can understand that measurement values in that portion cannot be obtained due to a black color or the like and it is made easy to see the portion when the black object is confirmed on the display.

As described above, in the present embodiment, as to the pixels of the distance measuring point group data, performed is the determination processing which determines as follows:

a condition (i): distance values of the pixels are the identifiers which indicate that the distance values are not obtained;

a condition (ii): distance values of the reference background data corresponding to pixels being targeted for the determination processing are not the identifiers; and a condition (iii): distance values of neighboring pixels which neighbor determination target pixels are smaller than the distance values of the reference background data corresponding to the neighboring pixels, and when all of the conditions (i) to (iii) are satisfied, predetermined distance values are substituted for the distance values of the pixels being targeted for the determination By performing the above-described processing and substitution, the predetermined distance values are substituted for the distance values of the pixels, which cannot be obtained, in the configuration in which the single measuring instrument is used, instead of a large-scale configuration in which a plurality of measuring instruments of a plurality of ToF systems are arranged as in Patent Literature 1, thereby allowing pixels indicating distance values of identifiers to be identified as pixels indicating a part of the object. Thus, accuracy of object detection can be enhanced.

For example, in a case of a black vehicle, even in a case where it is difficult to detect a distance of a vehicle body and distance values cannot be obtained (infinity), it is made possible to measure distance values of a bumper and a license plate as other parts or a spotlight. In such a case, distance values obtained from these parts can be substituted for distance values of the black vehicle body of the vehicle. At this time, as described above, the recursive substitution processing is enabled, whereby the distance values of the pixels up to the parts can be substituted and processed for most of distance values of pixels of the black vehicle body continuing to the parts such as the bumper. In particular, in the present embodiment, as shown in FIG. 4, the origin O is located in a lower portion in a gravity direction with the top-to-bottom direction turned upside down, the substitution processing of the pixels is performed sequentially toward an upward direction. Thus, with a part of the bumper or the license plate, which is located on a lower side of the vehicle body in general, as a starting point, distance values of pixels of the part located in the lower portion can be continuously substituted for the pixels of infinity which are located above this part. In the conventional processing, clustering of sizes of only parts cannot be appropriately processed and the black vehicle cannot be correctly recognized as the vehicle since the parts are excluded from the detection targets as with the rubbish and the small animal Even in such a situation, clustering can be processed using the distance values after the substitution as in the present embodiment to recognize a mass of a predetermined size or more. Thus, since the clustering which is equivalent to clustering for an original size of the vehicle main body can be appropriately processed, it can be prevented that the vehicle is excluded from the detection targets as with the rubbish and the small animal and correct recognition thereof can be made.

Second Embodiment

Hereinafter, with reference to FIGS. 10 and 11, image processing executed by an image processing device 200 according to a second embodiment will be described. FIG. 10 is a subroutine flowchart of step S11 in the second embodiment. FIG. 11 is a table showing determination conditions of pixels and determination results. FIG. 10 is the subroutine flowchart corresponding to the subroutine flowchart shown in FIG. 7A in the first embodiment, and other components thereof are the same as those in the first embodiment, and the description therefor will be omitted. In addition, also in FIG. 10, steps other than step S201, that is, steps S101 to S108 and steps S120 and S121 are the same as those shown in FIG. 7A, and the description therefor will be omitted.

In addition, FIG. 11 is the table corresponding to that shown in FIG. 5, and encircled numbers other than encircled numbers 4 and 6, that is, encircled numbers 1 to 3 and 5 in FIG. 11 are the same as the encircled numbers 1 to 3 and 5 in FIG. 5 and correspond thereto as they are.

In the second embodiment, as to a condition (iv): in distance measuring point group data of a temporally previous frame, it is determined that a pixel corresponding to a determination target pixel is not an identifier (infinity), and in a case where this condition (iv) in addition to the above-described conditions (i) to (iii) are satisfied, the pixel corresponding thereto is determined as a pixel with substitution (the "pixel with substitution" of the encircled number 4 in FIG. 11).
(Step S201)

Specifically, in step S201 in FIG. 10, a pixel determination part 222 references a pixel (i, j) in a previous frame in the same position (in the same irradiation direction) of one determination pixel (i, j) stored in a storage part 210 and determines whether or not a distance value of this pixel is an identifier (infinity). When the distance value is the identifier (YES), processing proceeds to step S107 and in this step S107, the pixel is determined as a "pixel without substitution" and substitution processing is not performed.

On the other hand, when the distance value is not the identifier (NO), the processing proceeds to step S108 and in this step S108, the pixel is determined as a "pixel with substitution", and a distance value of a neighboring pixel is substituted for a distance value of a determination pixel (i, j).

Note that although in the processing shown in step S201, as the condition (iv), the distance measuring point group data of the previous frame is stored in the storage part 210 and it is determined that the distance value in the distance measuring point group data of this previous frame is "not the identifier", instead of this, the determination may be made based on other condition. For example, (A) in history information data of a determination result, a determination result of the previous frame is not (5) "pixels without substitution" in step S107. Alternatively, (B) pixels of the previous frame are "foreground pixels" or pixels with substitution. By this determination of (A) or (B), it can be determined that the pixels of the previous frame are "not the identifiers".

As described above, in the second embodiment, further, it is determined that as the condition (iv), in the distance measuring point group data of the temporally previous frame, the pixels corresponding to determination pixels are not identifiers and when this is satisfied, substitution processing of predetermined distance values corresponding to distance values of neighboring pixels which neighbor the determination pixels are is performed. By performing the above-described determination and substitution, effects similar to those in the first embodiment can be obtained and further, the following effect can be obtained.

For example, in a case where it starts raining, a road surface is wet, and a puddle is made, thereafter, reflected light from that direction does not return and distance values come to be distance values of infinity. In the above-mentioned situation, in a case where a black object enters a part of a region of the puddle, erroneous detection in which distance values are substituted for distance values of not only the black object but also distance values of the whole puddle as distance values of (parts) of the black object (foreground) can be prevented. In particular, in a case where gusty rain falls and the whole surface of a road 61 within a measurement space 60 comes to be a puddle, erroneous detection in which distance values are once substituted for distance values of the black object as distance values of the whole surface thereof can be prevented.

The above-described configuration of the image processing device 200 in the object detection system 10 is described as the main configuration of each of the above-described embodiments to describe features of each thereof, the present invention is not limited to the above-described configuration, and a variety of modifications can be made within a scope of claims. In addition, a configuration of a general object detection system 10 or a general image processing device 200 is not excluded.

In addition, order of processes in processing shown in the flowcharts is not limited to that shown in the flowcharts, order of an anterior process and a posterior process may be interchanged. For example, the determination in step S201 shown in FIG. 10 may be performed immediately before step S104 in FIG. 10.

Furthermore, in the above-described embodiments, in FIG. 7A (FIG. 10) and FIG. 8, the example in which the pixels from the pixel of the origin O to the pixel in the lower right are processed in a forward direction only once by the processing of the loop 1 and the processing of the loop 2 is illustrated. Although the above-mentioned processing is adopted in order to facilitate the processing, the present invention is not limited to this. For example, the processing may be performed twice (one reciprocating processing) by further performing the processing in a backward direction. By performing the processing in the above-mentioned manner, dependency of positions of the pixels can be eliminated. For example, in a case where there are pixels (foreground pixels) in the lower left, whose distance values can be obtained, pixels which neighbor these pixels in an upper right direction (pixels targeted for pixel determination) can be sequentially subjected to the substitution processing as pixels with substitution in a recursive manner.

The means and the method for performing various kinds of processing in the image processing device 200 according to the above-described embodiments can be realized by any of dedicated hardware circuitry or a programmed computer. The above-mentioned program may be provided by, for example, a non-temporary computer-readable recording medium such as a USB memory and a digital versatile disc (DVD)-ROM or may be provided online via a network such as the Internet. In this case, the program recorded in the computer-readable recording medium is generally transferred to a storage part such as a hard disk and stored therein. In addition, the above-mentioned program may be provided as single application software or may be incorporated into software of a device as one function of the device.

This application is based on Japanese Patent Application (No. 2018-200132), filed on Oct. 24, 2018, and which application is incorporated herein by reference in its entirety.

REFERENCE SIGNS LIST

10 Object detection system
100 Measuring instrument
110 Lidar
200 Image processing device
210 Storage part
220 Processing part
221 Distance measuring point group data acquisition part
222 Pixel determination part
223 Object determination part
224 Output part
300 Display
60 Measurement space

The invention claimed is:

1. An image processing device comprising:
a hardware processor which acquires distance measuring point group data including a plurality of measurement pixels, the plurality of measurement pixels including a plurality of measurement distance values, respectively, each of the plurality of measurement distance values being calculated based on time intervals from when transmission waves directed in a plurality of orientations are applied from a measuring instrument toward a measurement space to when reflected waves of the transmission waves from a target object are received;
a storage part which stores reference background data being generated based on the distance measuring point group data, the reference background data including a plurality of reference pixels, the plurality of reference pixels including a plurality of reference distance values, respectively; and
a pixel determination part, wherein
at least one of the plurality of measurement distance values has a common identifier as the measurement distance value, the common identifier indicating that the at least one of the plurality of measurement distance values is unable to be acquired based on the reflected waves from directions in which the transmission waves are sent,
as to each of the measurement pixels of the distance measuring point group data being acquired from the hardware processor, the pixel determination part:
performs determination processing which determines:
a condition (i): a measurement pixel of the distance measuring point group data has the common identifier as a measurement distance value;
a condition (ii): a reference pixel of the reference background data corresponding to the measurement pixel of the distance measuring point data is not the identifiers; and
a condition (iii): a measurement neighboring pixel of the distance measuring point data has a measurement distance value smaller than a reference distance value of a reference neighboring pixel of the reference background data, the measurement neighboring pixel of the distance measuring point data neighboring the measurement pixel of the distance measuring point data, the reference neighboring pixel of the reference background data corresponding to the measurement neighboring pixel of the distance measuring point data, and
substitutes the measurement distance value of the measurement pixel of the distance measuring point data with a predetermined distance value when all of the conditions (i) to (iii) are satisfied.

2. The image processing device according to claim 1, further comprising an object determination part which performs object detection by using the reference background data and distance measuring point group data which has been subjected to processing of the substitution by the pixel determination part.

3. The image processing device according to claim 2, wherein the object determination part performs at least one of: determination of entering of an object or objects to a predetermined area which is set within the measurement space; counting of the object or objects passing through the predetermined area; and determination of a movement locus or movement loci of the object or objects.

4. The image processing device according to claim 1, wherein as the measurement distance values of the measurement neighboring pixels which are used for the determination of the condition (iii), measurement distance values which have been subjected to the substitution processing by the determination processing for the measurement neighboring pixels are used.

5. The image processing device according to claim 1, wherein
the hardware processor acquires a plurality of pieces of the distance measuring point group data being arranged in time series,
the pixel determination part further determines
a condition (iv): in the distance measuring point group data which is temporally previous, measurement pixels corresponding to the measurement pixels being targeted for the determination are not the identifiers, and
when all of the conditions (i) to (iv) are satisfied, the predetermined distance values are substituted for the measurement distance values of the pixels being targeted for the determination.

6. The image processing device according to claim 5, wherein the pixel determination part uses, as the distance measuring point group data which is temporally previous in the condition (iv), distance measuring point group data within a predetermined period of time from the distance measuring point group data which is subjected to the determination.

7. The image processing device according to claim 1, wherein the pixel determination part uses, as the predetermined distance values being used for the substitution, measurement distance values of measurement pixels which neighbor the measurement pixels being targeted for the determination or measurement distance values of surrounding measurement pixels which are present within a predetermined range from the measurement pixels being targeted for the determination.

8. The image processing device according to claim 1, wherein
the storage part has stored therein history information of the processing of the measurement pixels of the distance measuring point group data, and in the history information, at least information showing the measurement pixels with substitution for which the processing of the substitution has been performed is included.

9. The image processing device according to claim 8, further comprising an output part which displays the distance measuring point group data after the substitution, which has been subjected to the processing of the substitution by the pixel determination part, wherein in the display made by the output part, by referencing the history information, the measurement pixels with substitution are displayed in a manner in which the measurement pixels with substitution are identifiable from other measurement pixels.

10. The image processing device according to claim 1, wherein the measuring instrument is a lidar which applies laser light as the transmission waves.

11. A non-transitory recording medium storing a computer readable control program being executed by a computer which controls an image processing device performing image processing using distance measuring point group data showing distribution of distance values up to a target object, the image processing device including a storage part which has stored therein reference background data being generated based on the distance measuring point group data, the reference background data including a plurality of reference pixels, the plurality of reference pixels including a plurality of reference distance values, respectively, the control program comprising:

(a) acquiring distance measuring point group data including a plurality of measurement pixels, the plurality of measurement pixels including a plurality of measurement distance values, respectively, each of the plurality of measurement distance values being calculated based on time intervals from when transmission waves directed in a plurality of orientations are applied from a measuring instrument toward a measurement space to when reflected waves of the transmission waves from a target object are received, at least one of the plurality of measurement values of the distance measuring point group data being acquired in (a) having a common identifier as the measurement distance value, the common identifier indicating that the at least one of the plurality of measurement distance values is unable to be acquired based on the reflected waves from directions in which the transmission waves are sent;

(b) as to each of the measurement pixels of the distance measuring point group data, performing determination processing which determines:

a condition (i): a measurement pixel of the distance measuring point group data has the common identifier as a measurement distance value;

a condition (ii): a reference pixel of the reference background data corresponding to the measurement pixel of the distance measuring point data is not the identifiers; and a condition (iii): a measurement neighboring pixel of the distance measuring point data has a measurement distance value smaller than a reference distance value of a reference neighboring pixel of the reference background data, the measurement neighboring pixel of the distance measuring point data neighboring the measurement pixel of the distance measuring point data, the reference neighboring pixel of the reference background data corresponding to the measurement neighboring pixel of the distance measuring point data; and (c) substitutes the measurement distance value of the measurement pixel of the distance measuring point data with a predetermined distance value when all of the conditions (i) to (iii) are satisfied in (b), the control program causing the computer to perform the processing comprising (a), (b), and (c).

12. The non-transitory recording medium storing a computer readable control program according to claim 11, further comprising (d) performing object detection by using the reference background data and the distance measuring point group data which has been subjected to processing of substitution in (c).

13. The non-transitory recording medium storing a computer readable control program according to claim 12, wherein the processing further comprises (g) performing to the object detected at (d), at least one of: determination of entering of an object or objects to a predetermined area which is set within the measurement space; counting of the object or objects passing through the predetermined area; and determination of a movement locus or movement loci of the object or objects.

14. The non-transitory recording medium storing a computer readable control program according to claim 11, wherein as the measurement distance values of the measurement neighboring pixels which are used for the determination of the condition (iii) in (b), a measurement distance values which have been subjected to the substitution processing by the determination processing for the measurement neighboring pixels are used.

15. The non-transitory recording medium storing a computer readable control program according to claim 11, wherein in (a), a plurality of pieces of the distance measuring point group data being arranged in time series are acquired, in (b), further determined is a condition (iv): in the distance measuring point group data which is temporally previous, measurement pixels corresponding to the measurement pixels being targeted for the determination are not the identifiers, and in (c), when all of the conditions (i) to (iv) are satisfied, the predetermined distance values are substituted for the measurement distance values of the measurement pixels being targeted for the determination.

16. The non-transitory recording medium storing a computer readable control program according to claim 15, wherein used as the distance measuring point group data which is temporally previous in the condition (iv) in (b) is distance measuring point group data within a predetermined period of time from the distance measuring point group data which is subjected to the determination.

17. The non-transitory recording medium storing a computer readable control program according to claim 11, wherein used as the predetermined distance values being used for the substitution in (c) are measurement distance values of measurement pixels which neighbor the measurement pixels being targeted for the determination or measurement distance values of surrounding measurement pixels which are present within a predetermined range from the measurement pixels being targeted for the determination.

18. The non-transitory recording medium storing a computer readable control program according to claim 11, wherein the processing further comprises (e) storing, in the storage part, history information including at least information showing the measurement pixels with substitution for which the processing of the substitution has been performed in (c).

19. The non-transitory recording medium storing a computer readable control program according to claim 18, wherein the processing further comprises (f) displaying the distance measuring point group data after the substitution, which has been subjected to the processing of the substitution in (c), and in the display made in (f), by referencing the history information, the measurement pixels with substitution are displayed in a manner in which the measurement pixels with substitution are identifiable from other measurement pixels.

20. An image processing method being executed by an image processing device performing image processing using distance measuring point group data showing distribution of distance values up to a target object, the image processing device including a storage part which has stored therein reference background data being generated based on the distance measuring point group data, the reference background data including a plurality of reference pixels, the plurality of reference pixels including a plurality of reference distance values, respectively, the method comprising:

(a) acquiring distance measuring point group data including a plurality of measurement pixels, the plurality of measurement pixels including a plurality of measurement distance values, respectively, each of the plurality of measurement distance values being calculated based on time intervals from when transmission waves directed in a plurality of orientations are applied from a measuring instrument toward a measurement space to when reflected waves of the transmission waves from a target object are received, at least one of the plurality of measurement values of the distance measuring point group data being acquired in (a) having a common identifier as the measurement distance value, the common identifier indicating that the at least one of the plurality of measurement distance value is unable to be acquired based on the reflected waves from directions in which the transmission waves are sent;

(b) as to each of the measurement pixels of the distance measuring point group data, performing determination processing which determines:

a condition (i): a measurement pixel of the distance measuring point group data has the common identifier as a measurement distance value;

a condition (ii): a reference pixel of the reference background data corresponding to the measurement pixel of the distance measuring point data is not the identifiers; and a condition (iii): a measurement neighboring pixel of the distance measuring point data has a measurement distance value smaller than a reference distance value of a reference neighboring pixel of the reference background data, the measurement neighboring pixel of the distance measuring point data neighboring the measurement pixel of the distance measuring point data, the reference neighboring pixel of the reference background data corresponding to the measurement neighboring pixel of the distance measuring point data; and (c) substituting the measurement distance value of the measurement pixel of the distance measuring point data with a predetermined distance value when all of the conditions (i) to (iii) are satisfied in (b).

* * * * *